United States Patent [19]

Ayers

[11] Patent Number: 4,641,848

[45] Date of Patent: Feb. 10, 1987

[54] WHEELCHAIR WITH ROCKING SEAT ASSEMBLY

[76] Inventor: Robert C. Ayers, 3011 45th St., Des Moines, Iowa 50310

[21] Appl. No.: 723,370

[22] Filed: Apr. 15, 1985

[51] Int. Cl.[4] .............................................. B62B 11/00

[52] U.S. Cl. ............................ 280/242 WC; 280/647; 297/265; 297/DIG. 4

[58] Field of Search ........... 280/242 WC, 220, 226 R, 280/647, 650, 657; 297/DIG. 4, 265, 266, 267, 258

[56] References Cited

U.S. PATENT DOCUMENTS

| | | | |
|---|---|---|---|
| 3,100,638 | 8/1963 | Schoeffel | 272/33 |
| 3,167,350 | 1/1965 | Kiel | 297/267 |
| 3,415,531 | 12/1968 | Kiel | 297/261 |
| 3,712,671 | 1/1973 | Dalton | 297/258 |
| 3,953,054 | 4/1976 | Udden | 280/242 WC |
| 4,125,269 | 11/1978 | Kiel | 297/DIG. 4 |
| 4,164,354 | 8/1979 | Rodaway | 280/647 |
| 4,310,167 | 1/1982 | McLaurin | 280/5.28 |
| 4,544,200 | 10/1985 | Dunn et al. | 297/265 |

*Primary Examiner*—John J. Love
*Assistant Examiner*—Mark C. Dukes
*Attorney, Agent, or Firm*—G. Brian Pingel; Kent A. Herink

[57] ABSTRACT

An improved wheelchair formed of a frame, two pairs of support wheels for the frame, and a seat portion rockably connected to the frame and normally maintained in a generally horizontal alignment when the chair is unoccupied by bias springs that permit the seat to rock about its rockable connection while the frame and wheels of the chair are completely stationary.

6 Claims, 4 Drawing Figures

WHEELCHAIR WITH ROCKING SEAT ASSEMBLY

BACKGROUND OF THE INVENTION

1. Field of the Invention

The present invention relates in general to wheelchair assemblies employed to provide transportation for invalids or the aged, and more specifically relates to such assemblies that are adapted to fulfill a special need the user may have.

2. Description of the Prior Art

The present invention is an improved wheelchair that is directly derived from normal, common day wheelchairs presently being used. Wheelchairs are used by a surprisingly large percentage of the people living in the world. They are used not only by the physically handicapped, but also by invalids that, either for reasons of age or other problems, no longer have the capability for walking or at least for walking any great distances.

The common wheelchair is formed from a frame supported by a large pair of main wheels and a smaller pair of steering caster wheels normally located forwardly of the drive wheels. A seat is fixed with respect to the frame so that a user is provided support while being transported about in the chair. However, such chairs are relatively uncomfortable for long usage, especially for the aged.

Other different wheelchair designs are known in the prior art ror providing various specific functions. For example, in U.S. Pat. No. 3,953,054 a six-wheeled chair is disclosed. The chair is supposed to be more maneuverable and has a seat that can be varied in height and inclination. Also, the patent indicates in an oblique fashion that there is some type of spring suspension associated with the seat that permits the seat "to rotate against the spring action around a horizontal axis between the hocks and a vertical projection of the crutch of the occupant." The chair is designed to be supported by only four of its six wheels at a time and the occupant of the chair can control which wheels will be supporting by leaning back in the seat or leaning forward. Apparently, the spring suspension referred to above is used to facilitate the operator's support wheel control.

Although the "054" patent, as previously pointed out, refers to a spring suspension in use with a seat, the patent in no way shows or describes any structure forming the spring suspension. Obviously, the patent is not designed to provide a wheelchair with a rocking seat. If the occupant attempted to rock in the chair, the chair would alternate from being supported by the rear four wheels to the front four wheels in a somewhat jarring fashion that would not only be uncomfortable but would require a relatively large amount of body action that would be tiring.

Another example of an unusual wheelchair construction is shown in U.S. Pat. No. 4,310,167. Such patent discloses a wheelchair with an articulated chassis that permits an operator to change the center of gravity of the chair to vary its stability according to conditions encountered by the operator. Also, the chair includes a shock absorber and spring means that positively maintain a subframe and seat frame assemblies of the chair in a predetermined relationship but permits the subframe and seat frame assemblies to articulate relative to one another for increasing comfort when traversing rough ground.

It is clear from the disclosure of the "167" patent that it is neither adapted to nor does it show or describe the use of a wheelchair having a rockable seat. Thus, the prior art has not been directed toward the development of a wheelchair with a rockable seat. In U.S. Pat. No. 3,100,638 a baby rocker that has a rockable seat is shown and described. The baby rocker is designed to permit a baby to rock as much as it pleases and to provide a rotating motion of the wheels of the rocker while the seat is rocked to enhance the attraction of the device for the baby. Although the device disclosed in "638" has a rockable seat, the patent is obviously directed to a totally different field of art than the wheelchair art and in no way would lead one skilled in the art to the present invention. This statement is supported by the fact that the "638" patent was issued in 1963 and yet over twenty-two years later, there are still no wheelchairs available having rockable seats.

The present invention is adapted to provide an improved wheelchair having a rockable seat that permits a user to enjoy the rocking motion of the seat similar to that provided by a normal rocking chair while the frame and wheels of the wheelchair are held in a completely stationary position.

SUMMARY OF THE INVENTION

The present invention provides an improved wheelchair that permits a user to rock while seated in the chair. The wheelchair is formed of a frame, two pairs of support wheels for the frame, and a seat portion rockably connected to the frame and maintained in a generally horizontal alignment when the chair is unoccupied by bias means that permit the seat to rock about its connection with the frame while the frame and wheels are coxpletely stationary.

The frame is formed from opposite, spaced apart, rigid side members that are connected together by cross braces. The support wheels for the frame include a pair of main wheels, each of which is connected to one of the frame side members and at least one of which serves as a driving wheel for the chair, and a pair of caster wheels pivotally connected with the frame forwardly of the main wheels.

The seat includes two rigid spaced apart support rails and a support platform attached to and extending between the rails. The rockable connection of the seat extends between the side members of the frame and the support rails of the seat to permit the seat to rock about a horizontal axis traverse to the side members.

In a first preferred embodiment of the present invention, the rockable connection means is provided by a yoke member that is fixed to at least one of said side members and said seat support rails, and is rockably connected to the other of said side members and said rails. In a second preferred embodiment of the present invention, the rockable connection means is formed by two rigid generally V-shaped support members, each attached to one of the support rails and one of the frame side members, with the vertices of the support members being pivotally attached thereto. Although both preferred embodiments illustrate a non-motorized wheelchair, it should be apparent to those skilled in the art that the present invention can be employed with all types of wheelchairs including, but not limited to, motorized, racing and sport versions.

The invention will appear more clearly from the following detailed description when taken in conjunction with the accompanying drawings, showing by way of example, two preferred embodiments of the inventive idea wherein like numerals refer to like parts throughout.

DETAILED DESCRIPTION OF THE PREFERRED EMBODIMENTS

Figure 1:
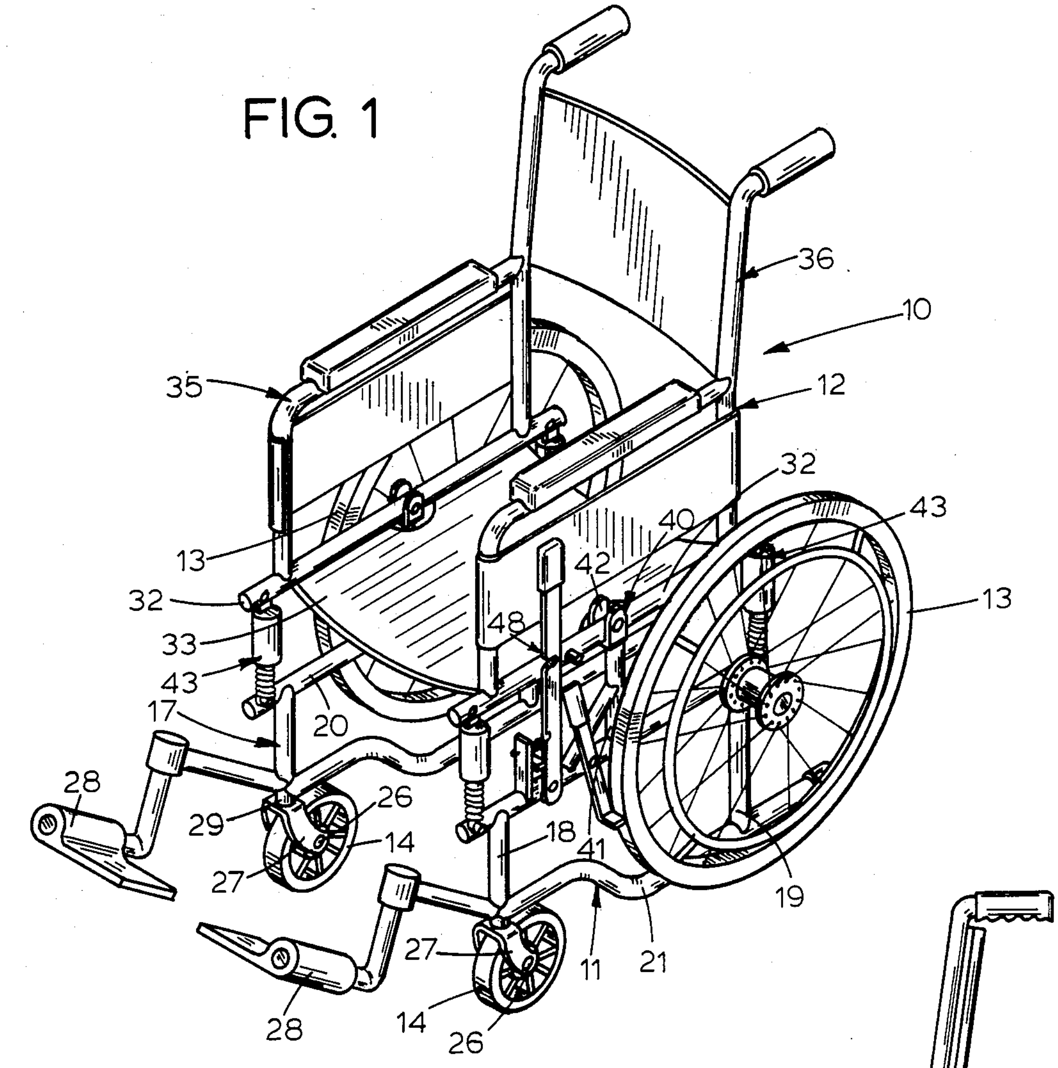
FIG. 1 is a side perspective of a first preferred embodiment of an improved wheelchair of the present invention that includes a rockable seat.

Referring now to the drawings and with reference first to FIG. 1, a first preferred embodiment of an improved wheelchair of the present invention is shown generally at 10. The wheelchair 10 includes a frame assembly 11, a seat assembly 12, a pair of main wheels 13 and a pair of caster wheels 14. Preferably, the frame assembly 11 is constructed of high strength, lightweight tubular members to provide a chair that is durable but yet is light enough that it can be handled relatively easily.

The frame assembly 11 is formed of upright side members 17 along each side of the chair 10. Each side member is typically formed of front and rear upright members 18 and 19 respectively, and upper and lower horizontal tubular members 20 and 21 respectively joined together in a generally rectangular configuration. Preferably, the side frame members 17 are joined together by cross braces 23 and 24 (not shown in FIG. 1 for purposes of clarity) and are pinned to one another at 25 to permit the wheelchair 10 to be folded to bring the side members 17 adjacent to one another, as is well known in the art.

Each side frame member 17 journals one of the main wheels 13 and provides a downwardly opening vertically aligned pivot socket 29 to mount the caster wheels 14 forwardly of the main wheels 13. Each of the caster wheels 14 is carried on a horizontal axle 26 mounted in an inverted U-shaped yoke 27. Preferably, foot assemblies 28 are attached in cantilever fashion to the upright tubular members 18 to support the feet and legs of a user.

The seat assembly 12 is extended transversely between the side frame members 17 and is formed from tubular side support members 32 and a pliable seat member 33 formed of leather fabric, nylon or the like that is attached to and extends between the support members 32. The seat assembly 12 may also have an armrest 35 associated with each of the side support members 32 and a backrest 36 secured to the rear ends of the side support members 32.

Figure 2:
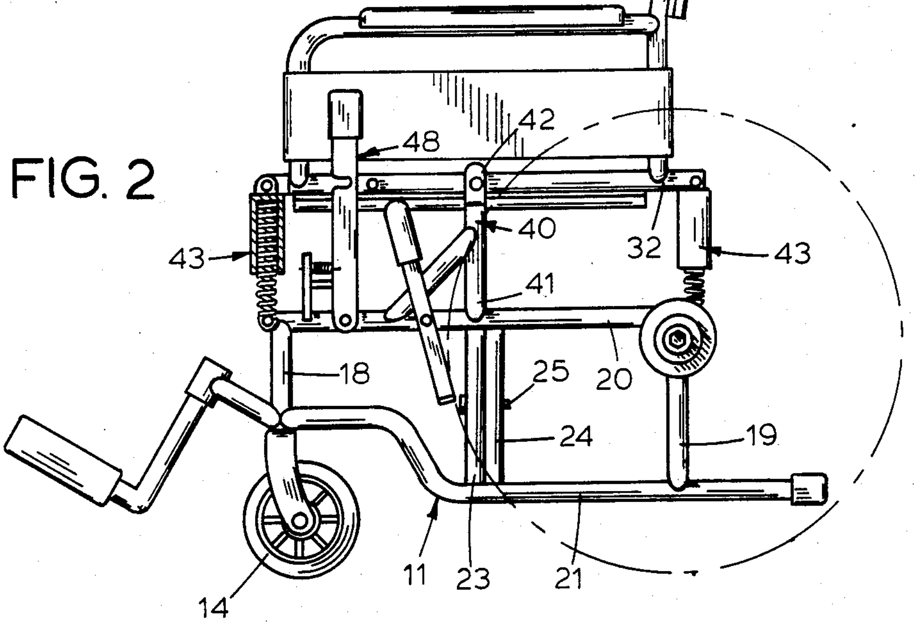
FIG. 2 is a side view of the wheelchair shown in FIG. 1 with the main wheels thereof represented by dotted lines for purposes of clarity.

As shown in FIGS. 1 and 2, the seat assembly 12 is rockably connected to the side frame members 17 by means of yoke mounts 40 that each have a lower end 41 fixed to one of the upper horizontal tubular members 20 and an upper U-shaped end 42 that is pinned to one of the side support members 32. Thus, the seat assembly 12 has a rocking action freedom of movement with respect to the frame assembly 11. To normally maintain the seat assembly 12 in a horizontal alignment, biasing means 43 in the form of spring assemblies are connected between the front and rear ends of the horizontal members 20 and side support members 32. Although the biasing means 43 are shown as springs herein, it should be well recognized in the art that a wide variety of other resilient members or other types of biasing members other than springs can be employed as the means 43.

Figure 3:
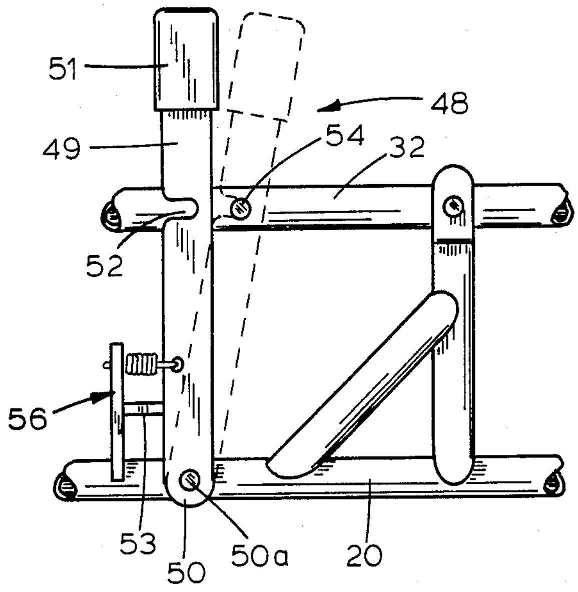
FIG. 3 is an enlarged fragmentary view of the wheelchair of FIG. 2 showing a locking lever assembly that forms part of the present invention.

Preferably, the wheelchair 10 includes a locking assembly 48 (best shown in FIG. 3) that serves to fix the seat assembly 12 in a horizontal alignment when the user desires as during travel of the chair 10. The locking assembly 48 is formed of a locking lever 49 having a lower end 50 that is pinned to one of the side frame horizontal members 20 at **50*a* and an upper end 51 that has a forwardly facing notch 52. The lever 49 is movable from a forward position in which it is adjacent a forward limit of movement abuttment 53 and a rearward position in which it is adjacent a locking stud 54. As the lever 49 is moved rearwardly, the pin connection 50*a* allows sufficient play between the lever 49 and the member 20 to move the upper end 51 of the lever 49 outwardly from the member 32 to move past the stud 54**.

When the lever 49 is in its rearward position, the locking stud 54 that extends outwardly from one of the side support members 32 is received in the notch 52 so that the lever 49 supports the seat assembly 12 from pivotal movement. A biasing spring assembly 56 is connected between the locking lever 49 and the associated horizontal member 20 to urge the locking lever in a forward direction to maintain the engagement between the locking stud 54 and the locking lever 49 when desired. The assembly 56 also supports the forward limit of movement abutment 53.

Figure 4:
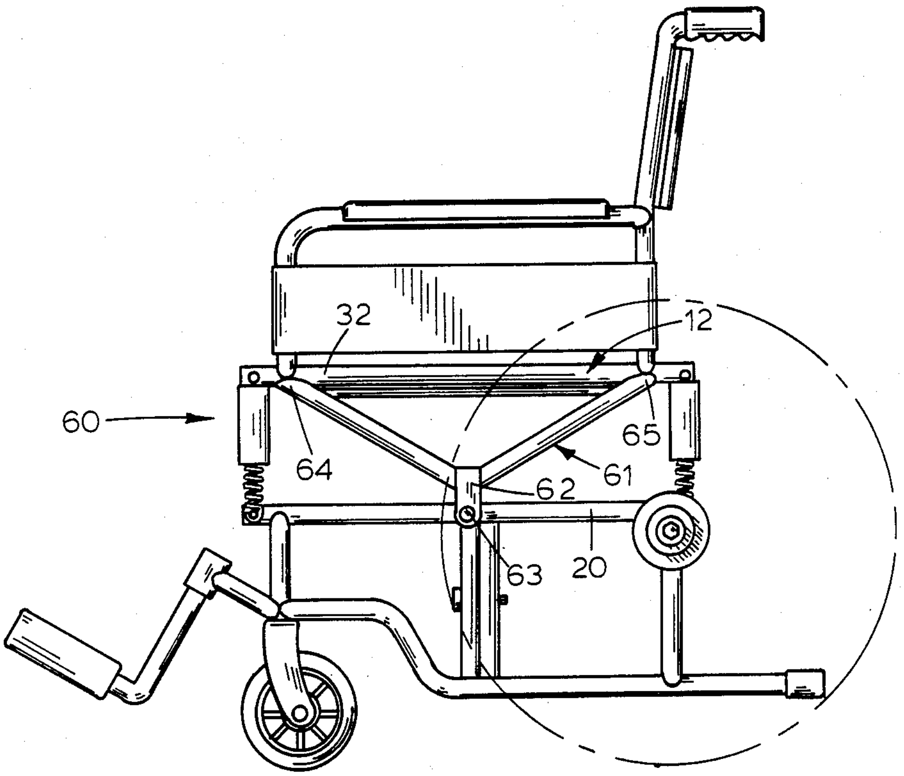
FIG. 4 is a view similar to that of FIG. 2, but showing a second preferred embodiment of the present invention.

As should be recognized in the art, a wide variety of other types of rockable connections can be employed in the present invention for attachment of the seat assembly 12 to the frame assembly 11. For example, referring now to FIG. 4, another type of such connection is shown in conjunction with a wheelchair 60 that forms a second preferred embodiment of the present invention.

The chair 60 is similar to the chair 10 except that rockable assemblies 61 are substituted for the yoke mounts 40. The rockable assemblies 61 are formed in a V-shape configuration with vertexes 62 pinned to the horizontal frame members 20 at 63, and upper ends 64 and 65 that are respectively fixed to the front and rear ends of the side support members 32. As a result, the seat assembly 12 has a freedom of rocking movement about the pin connections 63. Of course, it should be noted that the rockable assemblies 61 could be used in an inverted condition so that the pin connection 63 and point of rocking of the seat assembly 12 would be at the side support members 32. In like respect, the yoke mounts 40 of the wheelchair 10 could as well be inverted.

Thus, the present invention provides a unique and improved wheelchair means that provides a comfortable support for a user comparable to that of a normal rocking chair when desired. The chair may be used by persons of all ages (except for the very young) to provide a pleasant rocking action. Due to the rockable connections between the frame assembly 11 and the seat assembly 12 and the resilient action of the biasing means 43, a user of the chair 10 may sit normally in the seat 11 and with very little effort expended enjoy the rocking action of the seat assembly 12 as it rocks about its rockable connections without any movement of the wheels 13 and 14 or the frame assembly 11.

I claim:

1. An improved wheelchair that permits a user to rock while seated in the chair, said wheelchair comprising:

(a) a frame formed of spaced apart rigid side members connected together by cross braces, each of said side members including upper and lower tubular members;

(b) a pair of main wheels connected with said frame and at leat one of which serves as a driving wheel for the chair;

(c) at least one caster wheel pivotally connected with said frame;

(d) a seat portion having opposite tubular support members that are pivotally connected to said upper tubular members of said frame side members;

(e) bias means to normally maintain said seat portion in a desired alignment when the chair is unoccupied and to permit the seat to yieldably rock about its pivotable connection with said frame.

2. An improved wheelchair as recited in claim 1 wherein said chair further comprises means for controlling the rocking motion of said seat whereby when said means is actuated, said seat is held in a fixed position with respect to said frame.

3. An improved wheelchair as recited in claim 1 wherein said seat portion has a seat member, armrest means on oppostie sides of said seat member, and backrest means that forms a rear portion of said seat portion, which seat member, armrest means and a backrest means all are in a unitary construction whereby they move in unison.

4. An improved wheel chair as recited in claim 1 wherein said bias means extends between and is attached to said seat portion and said frame.

5. An improved wheelchair as recited in claim 1 wherein said seat portion includes a non-rigid seat platform.

6. An improved wheel chair as recited in claim 5 wherein said cross braces of said frame are foldable to permit said frame side members to be moved proximate to one another.

* * * * *